(12) United States Patent
Balandina et al.

(10) Patent No.: US 7,885,261 B2
(45) Date of Patent: Feb. 8, 2011

(54) PACKET CLASSIFICATION METHOD FOR NETWORKS WITH STATIC ROUTING

(75) Inventors: Elena Balandina, Helsinki (FI); Sergey Balandin, Helsinki (FI)

(73) Assignee: Nokia Corporation, Espoo (FI)

( * ) Notice: Subject to any disclaimer, the term of this patent is extended or adjusted under 35 U.S.C. 154(b) by 904 days.

(21) Appl. No.: 11/498,738

(22) Filed: Aug. 4, 2006

(65) Prior Publication Data
US 2007/0286186 A1 Dec. 13, 2007

(30) Foreign Application Priority Data
Jun. 7, 2006 (FI) ................... 20060563

(51) Int. Cl.
*H04L 12/28* (2006.01)
*H04L 12/56* (2006.01)
(52) U.S. Cl. .............. 370/392; 370/395.3; 370/400
(58) Field of Classification Search ............ 370/392
See application file for complete search history.

(56) References Cited

U.S. PATENT DOCUMENTS

| | | | |
|---|---|---|---|
| 5,386,413 A | 1/1995 | McAuley et al. | |
| 5,513,134 A * | 4/1996 | Cooperman et al. | 365/49.18 |
| 5,627,824 A * | 5/1997 | Arnold | 370/396 |
| 6,061,712 A | 5/2000 | Tzeng | |
| 6,223,172 B1 | 4/2001 | Hunter et al. | |
| 6,407,985 B1 * | 6/2002 | Jain | 370/256 |
| 7,197,039 B2 * | 3/2007 | Shizume | 370/401 |
| 7,213,021 B2 * | 5/2007 | Taguchi et al. | 1/1 |
| 7,457,292 B2 * | 11/2008 | Asano | 370/392 |
| 2005/0013308 A1 * | 1/2005 | Wybenga et al. | 370/396 |
| 2005/0021491 A1 * | 1/2005 | Horgan | 707/1 |

OTHER PUBLICATIONS

International search report PCT/FI2007/000133 filed May 16, 2007.

* cited by examiner

*Primary Examiner*—Daniel J Ryman
*Assistant Examiner*—Cassandra Decker
(74) *Attorney, Agent, or Firm*—Alston & Bird LLP

(57) ABSTRACT

Packet classification and routing in a data communication network with static routing procedure, wherein the routing is performed without using a routing table. First values for each common address bit of end service points adjacent to a switch as a response to a local subnet mask of the switch are defined. Then the packet flows from the current switch to the adjacent switches are forwarded in response to a value of differentiation bits. Unprocessed packets are forwarded to the main adjacent switch according to the main adjacent switch definition. Unforwarded are processed packets locally as exceptions.

10 Claims, 3 Drawing Sheets

PACKET CLASSIFICATION METHOD FOR NETWORKS WITH STATIC ROUTING

FIELD OF THE INVENTION

The invention relates to data communications network routing. The invention particularly relates to data communications networks with static routing procedures.

BACKGROUND OF THE INVENTION

The invention relates to routing and classification of data packets in a data communications networks. Routing is divided into two different categories that are applicable to different applications. In dynamic routing the routes change according to the changes in the network. In static routing the routing decision and the network do not change or the changes are not that frequent. When the network is reasonably static, static routing might be beneficial. A common nominator for both routing schemes is that they are based on routing tables. When a switch or router receives a data packet, it makes the routing decision based on the routing data in the routing table. This causes large routing tables that require memory and processing resources.

There are several different publications disclosing enhancements to static routing. For example, U.S. Pat. No. 6,215,765 discloses a method for establishing a switched virtual circuit in a digital network having network nodes with static routing tables. When a node is unable to forward over primary route and the secondary route is the same from where the data packets have arrived, the packet are attempted to reroute dynamically.

EP404339 discloses a further example wherein a packet routing apparatus allows numerous packets to be routed simultaneously through a mesh connected network. For each received packet the router generates a routing mask representing the output links that may be used to route the packet towards it destination. The routing mask includes a broadcast bit. If the broadcast bit is on, the packet must be simultaneously routed to all of the output links specified by the routing mask. If the broadcast bit is off, the packet may be routed on any single one of the links specified by the routing mask. U.S. Pat. No. 6,778,539 discloses using only a part of the destination address with the routing table. Thus this solution concerns an optimization of existing background art using routing tables.

The prior art solutions for static routing require full-size or longest prefix-based aggregated routing tables or broadcasting. This is inefficient as the preformed routing decisions are static by nature. The standard approach is based on the full implementation of the route lookup procedure that performs a search for the longest prefix match in the routing table for each packet. It increases implementation complexity of the network nodes and switches, requires high speed memory for storing routing tables and results in additional processing delay and energy consumption for each transmitted packet. Thus, there is a need for solution that simplifies the implementation and solves the other drawbacks of the prior art.

SUMMARY OF THE INVENTION

The invention discloses a packet classification and routing in a data communication network with static routing procedure, wherein the routing is performed without using a routing table. First values for each common address bit of end service points adjacent to a switch as a response to a local subnet mask of the switch are defined. Then the packet flows from the current switch to the adjacent switches are forwarded in response to a value of differentiation bits. Unprocessed packets are forwarded to the main adjacent switch according to the main adjacent switch definition. The main central switch (i.e. the most top switch in hierarchy of main adjacent switches) forwards all unprocessed packets to default network switch (which for the main switch is some kind of main adjacent switch). If some switch doesn't have main adjacent switch, all unprocessed packets are processed locally as exceptions.

The system according to the present invention comprises a plurality of network elements that are configured according to the present invention, such as routers, switches and alike. The system further comprises end service points that are connected to the network elements. A system according to the present invention comprises a plurality of switches, wherein one of the switches is configured as a main adjacent switch and at least one end service point. The plurality of switches are configured to route data packets to the end service points and adjacent switches as a response to a local subnet mask and differentiation bits and the main adjacent switch is configured to receive unprocessed packets. Switches connected to a plurality of switches are configured as central switches. Switches are configured to classify whether the packet destination belongs to the local subnetwork based on local subnet mask. The main adjacent switch is defined as an association of a local port and a default route.

A benefit of the invention for the networks with static routing is that the invention allows completely removing full-size routing tables from end nodes and network switches and routers and replacing it by mapping of allowed values of the selected bits of the packets destination addresses to ID of allowed routing solution (e.g. outgoing port ID). For some corner cases, especially when very efficient use of the address space is required, the method introduces a route association table which maximal size is equal to the number of allowed routing solutions, i.e. in most cases number of active outgoing ports, minus one. It is important to note that even in this case the invention allows to predict size of the route association tables at the device design phase, as the maximum size is bounded by the number of allowed routing decisions (e.g. number of ports that switch has), and not at the network planning phase as it is now.

As a consequence the invention allows making better optimization of the module's memory, reduces its price, and opens door for additional low-level optimizations. From the packets treatment point of view, the invention replaces grouping of the routing decisions based on the longest prefix match, by grouping based on the final routing decision, and as a result it allows to replace the route lookup procedure that performs sequential search in the routing table, by the function that obtains routing decision by analyzing a certain area of the destination address, where position and size of the area are configurable for every switch. As a result it speeds up the routing procedure and reduces power consumption.

BRIEF DESCRIPTION OF THE DRAWINGS

The accompanying drawings, which are included to provide a further understanding of the invention and constitute a part of this specification, illustrate embodiments of the invention and together with the description help to explain the principles of the invention. In the drawings.

DETAILED DESCRIPTION OF THE INVENTION

Reference will now be made in detail to the embodiments of the present invention, examples of which are illustrated in the accompanying drawings.

The present invention discloses a new forwarding procedure for networks with static routing. The new forwarding procedure makes route classification decision by mapping values of the certain areas of destination address to the available set of outgoing ports. Depending on a role of switch or router element, or alike, in the network, the packet route classification procedure comprises one, two or three steps. Description of these steps simplifies description of the present invention, as each step addresses on possible type of adjacent node, wherein end service points are covered by step one, main adjacent switch that is used as a default path to the network are covered by step three, and other adjacent switches are covered by step two.

Figure 1:
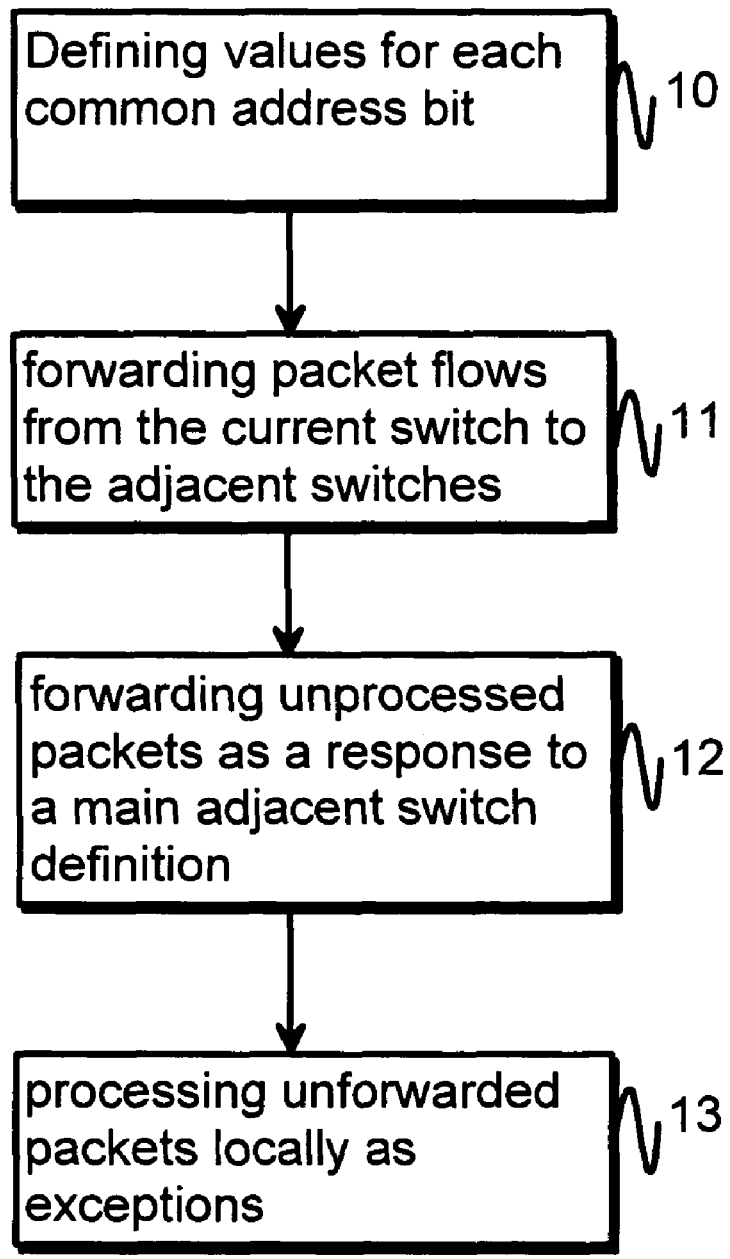
FIG. 1 is a flow chart of a method according to the present invention.
Figure 2:
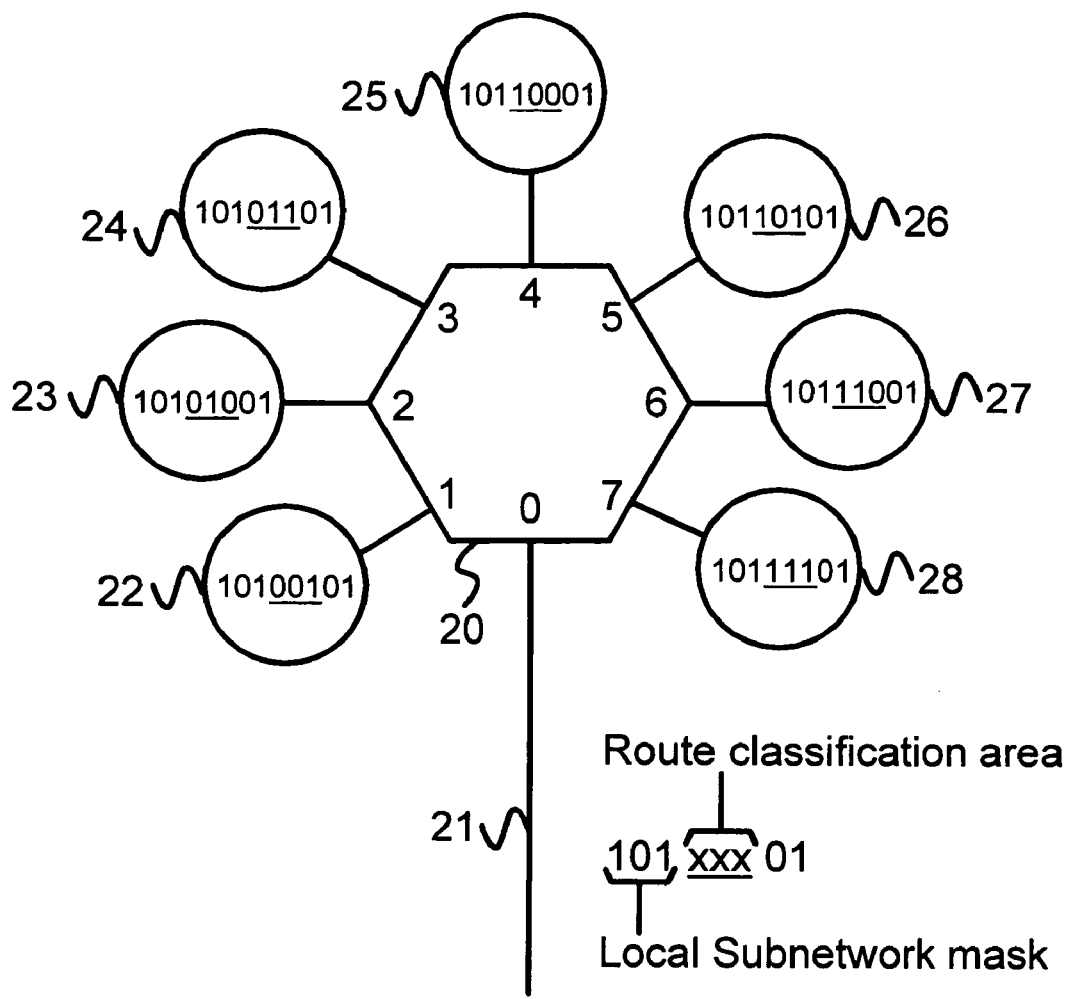
FIG. 2 is a block diagram of an example embodiment of a routing element according to the present invention.

In FIG. 1 the first step 10 is performed only if the switch local subnetwork mask is set and matches to the destination address of the received packet flow. The switch local subnetwork mask defines value of all common address bits for end service points adjacent to the switch. The switch local subnetwork masks are set only for the peripheral switches (that have adjacent end service points) and used for verifying that the packet is at the right destination. The switch makes forwarding decision based on a route classification area, of which an example is disclosed in FIG. 2. The route classification area is a set of bits in the destination address, which allows the network element 20, such as a router, switch, or alike, to classify to which of the adjacent end service points 22-28 the flow is addressed. The flow is received from data communication connection 21 that is connected to another network element, such as a router, switch or alike. The route classification area is defined by the size that reflects number of allowed routing decisions, for example, the number of outgoing ports towards end service point, and by its offset in the destination address. The offset and size are defined as smallest values, which allow distinguishing flows to N destination addresses, where N is a number of adjacent end service points. Based on that the size is equal to $\log_2(N)$ rounded up to the closest integer.

It is important to note that any subset of the destination address, and correspondingly any offset value can be used. The route classification procedure defines ID of the outgoing port as a value of the route classification area corrected by the value of ID shift, where ID shift is defined individually for each switch. For example, if switch has 4 adjacent end service points with 32-bits addresses: 10.0.0.2, 10.0.0.3, 10.0.0.4 and 10.0.0.5, and the corresponding port IDs are 4-7, as the lower ports are connected to other switches, then the route classification area size is 2, offset is 29 so that the route classification area covers bits 29 and 30, and now for correct mapping of these two bits of the route classification area to the allocated outgoing port IDs, a positive ID shift of value 4 has to be done. If the switch does not have outgoing port with the calculated ID, the case is handled by third step of the proposed procedure.

The second step 11 implements efficient forwarding of packet flows from the current switch to all adjacent switches, except the main adjacent switch. Similar to the first step, the switch makes forwarding decision based on a value of differentiation bits. The differentiation bits field is a set of bits in the destination address, which allows classifying flows addressed to the adjacent switches. The differentiation bits field is defined by the offset in the destination address and size, and it is set individually for each switch. The offset and size are defined as smallest values, which allow to distinguish flows addressed to N groups of destination addresses, where N is a number of adjacent switches, excluding the main adjacent switch. In the well designed networks the field size is equal to $\log_2(N)$ rounded up to the closest integer, however, in some corner cases the field area might be larger.

At the second step, the route classification procedure maps the value of the differentiation bits to the set of outgoing ports towards the adjacent switches. In a general case, the mapping is performed by using a route mapping table, which associates outgoing port ID with the corresponding value of differentiation bits, and has size equal to a number of adjacent switches. The alternative solution is to use the same approach as described in the first step of the invented procedure, i.e. to directly use the value of the differentiation bits as an outgoing port ID. This approach can be used only when it is guaranteed that the value of differentiation bits for all flows is mapped to the outgoing port toward correct adjacent switch, or it is mapped to non-existing port ID, if the correct route for such flows is towards the main adjacent switch, as this case is handled by third step of the proposed procedure.

Despite to the strong restrictions, there are a lot of example cases where the alternative approach can be applied, for example, on the central network switches, which are adjacent only with switches and do not have adjacent end points. Actually this case can be seen as a special case of the first step of the proposed procedure. The important feature is that a flow cannot be forwarded back to the same node from where it was received. If the direction obtained in the local mapping procedure informs that the packet has to be sent back to the same switch, it will be instead sent to the main adjacent switch. This rule prevents creation of the traffic loops on the link and allows implementation of centralized handling of all routing errors at the default network switch. It also allows to utilize unused address space that is covered by the route classification areas of the switches down the line but not presented in their subnetworks, which is possible as a number of end service points adjacent to the switch not always is equal to the powers of 2, for example, 2, 4, 8, and so on.

The third step 13 implements default treatment of the packets, which were not processed in the previous steps. If the main adjacent switch is defined, all unprocessed packets are forwarded to it, step 12. Otherwise they are treated locally as exceptions and the switch sets a corresponding alert signal and drops the packets, step 13. In practice this concept is very similar to the idea of default route.

Figure 3:
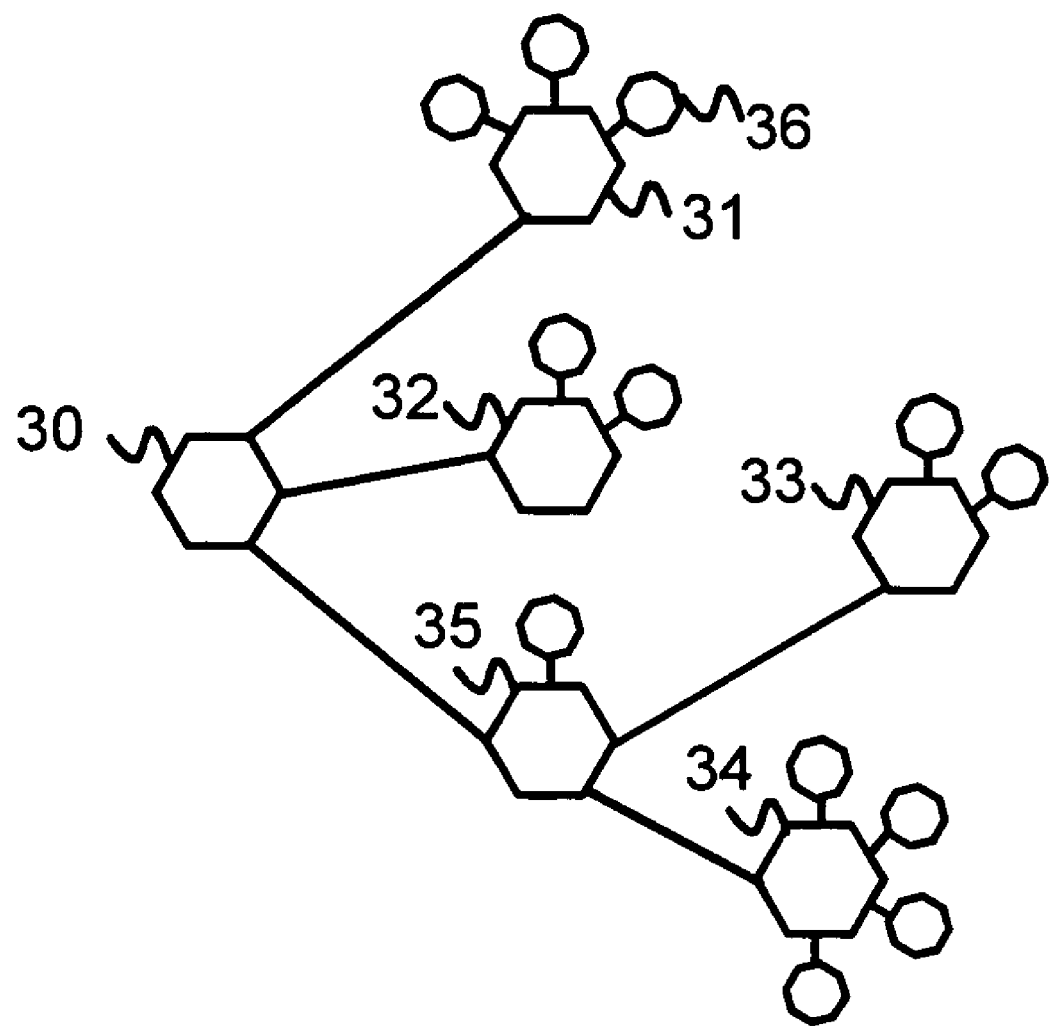
FIG. 3 is a block diagram of an example network implementation according to the present invention.

Based on the procedure described above the following four routing configurations of the network devices are defined. FIG. 3 discloses an example configuration of the network devices.

1) End service point 36 implements only the third step of the described procedure and performs default routing of all packets to the directly adjacent peripheral switch. No routing settings are required.

2) Simple peripheral switch 31, 32, 33, 34 is a switch connected to only one other switch and has a number of adjacent end service points that form local subnetwork. These switches implement first and third steps routing within local subnetwork and forwarding other traffic to the main adjacent switch. The following routing settings are required:

a) local subnetwork mask for classifying whether the packet destination might belong to the local subnetwork, b) route classification area is a certain area in the destination address field of the packet that classifies uniquely packets in the local subnetwork, c) value of ID shift for translating values of the route classification area to the correct outgoing port towards end service point in the local subnetwork, and d) main adjacent switch is defined as an association of one of the local ports with the default routing solution.

3) Complex peripheral switch 35 is a switch connected to a number of switches and end service points. Such switches implement all three steps of the defined procedure. First the switch checks if the packets flow is addressed to the local subnetwork and if yes, the switch routes it to the corresponding end service point. Otherwise it separates groups of flows and forwards them to the corresponding adjacent switches according to the second step and other traffic is forwarded to the main adjacent switch. Comparing to the simple peripheral switch this switch requires the following additional routing setting:

a) differentiation bits field is an area in the destination address field of the packet that allows uniquely classify packets for routing to subnetworks of the corresponding adjacent switches.

It is important to mention that most of network types, for which the current invention is made, do not use complex peripheral switches as their use is also related to a number of additional problems in general network planning. Thus, this scenario is very unlikely.

4) Central switch 30 is a switch connected to a number of switches. These switches implement second and third steps of the proposed procedure and in most cases more efficient implementation of the second step is possible. The following routing settings are required:

a) Differentiation bits field is a certain area in the destination address field of the packet that allows uniquely classify packets for routing to subnetworks of the corresponding adjacent switches, and b) Main adjacent switch is defined as an association of one of the local ports with the default routing solution.

As we can see from the listed above characteristics of the network devices, the proposed solution is extremely simple from the implementation point of view, allows completely replacing heavy mechanisms of classical route classification that is based on routing-table lookup, and provides a lot of possibilities for the further optimization. The method replaces comparison of the destination address with the addresses in the routing tables of all intermediate switches by the direct calculation of outgoing ports ID based on the certain areas of the destination address plus verification whether address matches to the subnetwork mask on peripheral switches.

For achieving good performance the network should be designed according to the following recommendations. However, the present invention is beneficial even if all of the following recommendations cannot be met. The network should be designed with switch units with the number of outgoing ports equal to powers of 2. It is recommended that one port of the peripheral switches is connected to one of central network switches and others are connected with the end service points. Usually it is better to avoid using complex peripheral switches. The central network switches should advantageously be adjacent only with other central and peripheral switches. Special attention should be given to design of the default network switch (which is the main adjacent switch of the main central switch) subnetwork, which in most cases is presented by a single end service point that takes care of handling network error cases but in some cases it has to implement a subnetwork with a simple peripheral switch in the center.

After the network topology is defined, the following network address assignment rules can be used for assisting the designer(s) to make proper planning of the network.

1) Define which of the central network switches has the smallest summary ratio of the subnetworks sizes attached to its ports. The subnetwork size is calculated as a number of end service points the shortest paths to which, in any measure best applicable for a given network type, go via the corresponding port. Only one ratio is calculated for each possible pair of outgoing ports, where the size of bigger subnetwork attached to the port is divided by the size of smaller subnetwork. Based on that the ratio is always greater or equal to one.

2) At the selected central switch, set the differentiation bits field to be mapped to the top K bits of the available address space, where $K=\log_2(N)$ rounded up to the closest integer, and N is a number of outgoing ports on the switch. For the first processed central switch (hereafter main central switch), the differentiation bits offset is 0 and size is K.

3) The main adjacent switch of the main central switch is called the default network switch. This switch has a special role in the network as it is only place where all unused addresses, covered by the route classification area, but not presented in the corresponding subnetworks of the peripheral switches, can be used, as all traffic, which was not processed in the network will end up here. It is also a place where handling of the routing error cases should be performed. The default network switch gives a way of utilizing the unused address space, but it is quite implementation expensive solution, so it is recommended to use it only when there is no other address space left. If the network does not need to utilize all available address space, then the default network switch does not need to play role of the switch and the corresponding reference of the main central switch should point to a central network errors handling device. Otherwise the default network switch is build using the following rules:

a) The default network switch is a simple peripheral switch that can perform address mapping by using mapping table, which associates outgoing port ID with the corresponding value of the route classification area. In case if only one subset of unused address space fulfills to the target number of end service points, the table scheme might be replaced with the values translation rule and then ID shift value has to be specified accordingly.

b) The local subnetwork mask covers all bits that are in common for all subnetwork addresses, and this is the main criterion for selecting which addresses from the unused address space should be allocated for the subnetwork service points.

c) The main adjacent switch is pointing to the main central switch, but in addition the default network switch defines a port for handling traffic that is classified to the same port from where it was originally received. This additional port is pointing to the central network errors handling device.

4) For each central switch directly connected to the main central switch, we set the differentiation bits field to be mapped to the top K' bits of the available address space that excludes differentiation bits of the main central switch. The value K' is equal to $\log_2(N')$ rounded up to the closest integer, and N' is a number of outgoing ports on the switch. The differentiation bits offset is calculated as a value of offset plus size of the differentiation bits field at the upper level switch for the switches directly connected to the main central switch it is equal to 0+K=K value defined at step 2) and the size of differentiation bits field is K'. The main adjacent switch reference is pointing to the upper level central switch.

5) The step 4 is repeated for all central network switches taking into account the offset and size of the differentiation bits field of the upper level switch and by setting upper switch to be the main adjacent switch.

6) After setting all the central switches, the peripheral switches are set. For the peripheral switches we define prefix of the local subnetwork mask equal to a set of all differentiation bits fields along the shortest path to the main central switch. The offset of route classification area should be set to the end of local subnetwork mask prefix. The size of route classification area depends on how we want to use the unused parts of the address space (difference between total address length and size of the local subnetwork mask prefix plus size of required route classification area $M=\log_2(N'')$ rounded up to the closest integer, where N'' is a number of outgoing ports of the switch):

a) One embodiment is to use the remaining tail bits of the destination address for some special purposes, for example, MIPI/UniPro allows using tail address bits for identifying special "hardware" ports at the end service points. In this case the route classification area size should be set equal to M as defined above. In practice it means that one end service point is getting a set of network addresses defined by the tail bits. The additional addresses can be also used for building static multipath and load balancing mechanisms.

b) Another option is to let reuse the remaining address space under the default network switch. In this case the size should be set to a difference of total address length and size of the local subnetwork mask prefix. The same solution should be taken when this address space is not needed (end points with the corresponding addresses are not defined in the network) and then packet with such destination should be send to the default network switch, where it will be handled by the central network errors handling device.

7) The end service points addresses are allocated based on the value of the local subnetwork mask and adjacent port ID of the corresponding switch. The end point does not need to perform verification of the destination address of the received packet, as such verification is already performed by the adjacent peripheral switch as a part of the route classification process.

8) If the network contains complex peripheral switches, for them first the value of the differentiation bits field should be defined according to point 4, where total number of outgoing ports is replaced by the number of outgoing ports adjacent to the other switches plus one value should be reserved for the local subnetwork mask. This value should be used for extending size of the local subnetwork mask prefix and then actions according to points 6 and 7 should be taken.

Note that the described network planning procedure assumes that a switch does not have address, but if it is required then at the planning phase the switch should be logically split to the pure switch and end service point to which a certain address can be allocated using the same address allocation rules as for other end service points within the local subnetwork.

The network planning procedure presented above suggests an example set of rules by using which the invention-compatible network planning can be done. It should be understood that a person skilled in the art uses professional expertise in the planning and other network planning rules might be used, as long as they inline with the main restrictions of the invention. The actual network planning depends on the network requirements. Different needs require different types of networks. Thus, different planning techniques are applied when needed.

It is obvious to a person skilled in the art that with the advancement of technology, the basic idea of the invention may be implemented in various ways. The invention and its embodiments are thus not limited to the examples described above; instead they may vary within the scope of the claims.

The invention claimed is:

1. A method comprising:

using a local subnet mask in which a respective value is defined for each common address bit of network nodes adjacent to a current node, wherein the network nodes are included in a network with static routing;

causing forwarding, of packets that include a destination address having common address bits that match the local subnet mask, from the current node to the adjacent network nodes, using, as port addresses in the current node, values that are determined from bits of the destination address that are not the common address bits;

causing forwarding of packets that do not have a destination address having common address bits that match the local subnet mask to a main adjacent switch when an adjacent switch is defined as the main adjacent switch; and processing packets that do not have a destination address having common address bits that match the local subnet mask locally as exceptions when no adjacent switch is defined as a main adjacent switch.

2. The method according to claim 1, wherein the current node classifies the packet destination address as belonging to a local subnetwork, based on the local subnet mask.

3. The method according to claim 1, wherein the adjacent switch is defined as the main adjacent switch when the adjacent switch is associated with a local port and a default route.

4. An apparatus comprising:

a router configured to route a data packet, in a network with static routing, to end service points and adjacent network nodes using, as a port address in the router, values that are determined from bits of a destination address in the data packet, wherein the bits used to determine the values are not common address bits of the destination address used for indicating a subnet of the router.

5. The apparatus according to claim 4, wherein the router is further configured to receive packets from other network elements, the other network elements having forwarded the packets in response to determining that the packets do not have common address bits that match the other network elements' respective local subnet masks, and the other network elements having defined the router as a main adjacent switch.

6. The apparatus according to claim 4, wherein the router comprises a first switch.

7. The apparatus according to claim 6, wherein the first switch is connected to a second switch, the second switch being configured to forward packets to other switches including the first switch.

8. The apparatus according to claim 4, wherein the router is configured to use a local subnet mask that classifies whether the packet destination belongs to a local subnetwork, and wherein the router being configured to route the data packets includes being configured to route data packets that belong to the local subnetwork to the end service points.

9. The apparatus according to claim 4, wherein the router being configured to route the data packets includes being configured to route data packets having common address bits that match a local subnet mask to the end service points; and wherein the router is further configured to route at least some data packets that do not have common address bits that match the local subnet mask to a main adjacent switch, being an adjacent switch associated with a local port and a default route.

10. An apparatus comprising:

means for using a local subnet mask in which a respective value is defined for each common address bit of network nodes adjacent to a current node, wherein the network nodes are included in a network with static routing;

means for causing forwarding, of packets including a destination address having common address bits that match the local subnet mask, from the current node to the adjacent network nodes, using, as port addresses in the current node, values that are determined from bits of the destination address in the packets that are not the common address bits;

means for causing forwarding of packets that do not have a destination address having common address bits that match the local subnet mask to a main adjacent switch when an adjacent switch is defined as the main adjacent switch; and means for processing packets that do not have a destination address having common address bits that match the local subnet mask locally as exceptions when no given switch is defined as a main adjacent switch.

* * * * *